(12) United States Patent
Karasawa (10) Patent No.: US 8,208,058 B2
(45) Date of Patent: Jun. 26, 2012

(54) AUTOMATIC FOCUSING APPARATUS

(75) Inventor: Katsumi Karasawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 267 days.

(21) Appl. No.: 12/769,223

(22) Filed: Apr. 28, 2010

(65) Prior Publication Data

US 2010/0277639 A1 Nov. 4, 2010

(30) Foreign Application Priority Data

Apr. 30, 2009 (JP) ................................. 2009-110873

(51) Int. Cl.
*G03B 13/00* (2006.01)
(52) U.S. Cl. .............................. 348/345; 396/89; 396/96
(58) Field of Classification Search ................... 348/345
See application file for complete search history.

(56) References Cited

U.S. PATENT DOCUMENTS

| | | | | |
|---|---|---|---|---|
| 4,988,856 | A * | 1/1991 | Hamada et al. ............. | 250/201.8 |
| 5,053,801 | A | 10/1991 | Ishida et al. | |
| 5,061,953 | A | 10/1991 | Higashihara et al. | |
| 5,151,732 | A | 9/1992 | Akashi et al. | |
| 5,359,382 | A * | 10/1994 | Uenaka ........................... | 396/95 |
| 5,498,944 | A * | 3/1996 | Nakata .......................... | 318/640 |
| 5,652,924 | A | 7/1997 | Yamano | |
| 5,664,237 | A | 9/1997 | Watanabe | |
| 5,664,239 | A * | 9/1997 | Nakata ........................... | 396/104 |
| 5,724,619 | A * | 3/1998 | Hamada et al. ................. | 396/82 |
| 5,734,938 | A * | 3/1998 | Hamada et al. ................. | 396/95 |
| 5,892,991 | A * | 4/1999 | Hamada et al. ............... | 396/147 |
| 5,896,174 | A * | 4/1999 | Nakata .......................... | 348/348 |
| 6,404,986 | B1 | 6/2002 | Morikawa | |
| 8,000,591 | B2 * | 8/2011 | Karasawa ....................... | 396/95 |
| 2004/0223073 | A1 | 11/2004 | Kanai | |
| 2006/0104621 | A1 | 5/2006 | Nakata | |

FOREIGN PATENT DOCUMENTS

| | | |
|---|---|---|
| EP | 0 427 292 A2 | 5/1991 |
| EP | 1 037 086 A2 | 9/2000 |
| GB | 2 223 139 A | 3/1990 |
| JP | 4-217237 A | 8/1992 |
| JP | 8-101337 A | 4/1996 |

OTHER PUBLICATIONS

Karasawa, Katsumi. "Automatic Focusing Apparatus", Specification and Drawings of unpublished related co-pending U.S. Appl. No. 12/769,191, filed Apr. 28, 2010. pp. 1-33.
Extended European Search Report issued in European Patent Application No. 10160591.3 dated Jul. 21, 2010.

* cited by examiner

*Primary Examiner* — Sinh Tran
*Assistant Examiner* — Paul Berardesca
(74) *Attorney, Agent, or Firm* — Rossi, Kimms & McDowell LLP (57) ABSTRACT

An automatic focusing apparatus includes: plural focus detection units detecting focus states in plural areas independently; a unit measuring detection time of the focus detection units; a unit calculating a maximum focus detection time; a unit calculating defocus amounts based on outputs from the focus detection units; a unit driving a focus lens based on the defocus amounts; and a unit calculating an object predicted position. When the focus detection time exceeds the maximum focus detection time, all detections by the focus detection units are completed, defocus amounts corresponding to the respective plural areas are calculated based on the focus states in the areas detected by the focus detection units, and the focus lens is driven according to an output of the focus detection unit corresponding to a focus target position where a difference between the focus target position and the object predicted position is within an allowable range.

7 Claims, 7 Drawing Sheets

AUTOMATIC FOCUSING APPARATUS

BACKGROUND OF THE INVENTION

1. Field of the Invention

The present invention relates to optical apparatuses such as a television lens and a video lens, and, more particularly to an optical apparatus having an auto focus function.

2. Description of the Related Art

Conventionally, various proposals have been made as an auto focus (AF) technique in image taking apparatuses such as a camera and a video camera. For example, light beams from an object that have passed different exit pupil regions of a shooting lens are imaged on a pair of line sensors and a relative position displacement amount of a pair of image signals obtained by photoelectrically converting object images is calculated. An automatic focusing method for calculating a defocus amount of the object on the basis of the displacement amount and performing driving of the shooting lens is well known.

In image taking of moving images, it is necessary to control the position of a focus lens to constantly and automatically perform focusing.

Japanese Patent Application Laid-Open No. H04-217237 discloses a method of predicting, when it is temporarily impossible to perform focus detection, a position where an object is going to based on the moving speed of the object in the past and maintaining an in-focus state.

Japanese Patent Application Laid-Open No. H08-101337 discloses a method of adaptively switching lens driving according to a focus detection in order to obtain an in-focus state.

It is necessary to provide, in order to constantly maintain an in-focus state with respect to an object moving at high speed, plural focus detection systems to continue to capture the target object during taking moving images.

However, the prior arts disclosed in Japanese Patent Application Laid-Open No. H04-217237 and Japanese Patent Application Laid-Open No. H08-101337 do not cope with movement and a change in the object during taking the moving images and do not take into account an increase in processing time due to the provision of the plural focus detection systems and the influence of the prolonged processing time on the in-focus state. Therefore, it is difficult to maintain the in-focus state.

SUMMARY OF THE INVENTION

Therefore, it is an object of the present invention to provide an automatic focusing apparatus that enables to maintain an in-focus state irrespectively of various image taking environments and speed of an object to be shot.

An automatic focusing apparatus according to the present invention includes: plural focus detection units that detect focus states in plural areas independently from one another; a measuring unit that measures focus detection time of the detection by the focus detection units; a unit that calculates and sets a maximum focus detection time; a defocus calculation unit that calculates defocus amounts on the basis of outputs from the focus detection units; a focus drive unit that drives a focus lens on the basis of the defocus amounts; and an object position prediction unit that calculates an object predicted position based on the defocus amounts and the focus detection time. When the focus detection time exceeds the maximum focus detection time, all detections of focus positions by the plural focus detection units are completed. The defocus calculation unit calculates defocus amounts corresponding to the respective plural areas on the basis of the focus states in the areas detected by the plural focus detection units. The focus lens is driven according to an output of the focus detection unit corresponding to a focus target position among focus target positions based on the plural defocus amounts where a difference between the focus target position and the object predicted position is within an allowable range.

According to the present invention, it is possible to always maintain an in-focus state with respect to an object irrespectively of an image taking environment and object speed.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
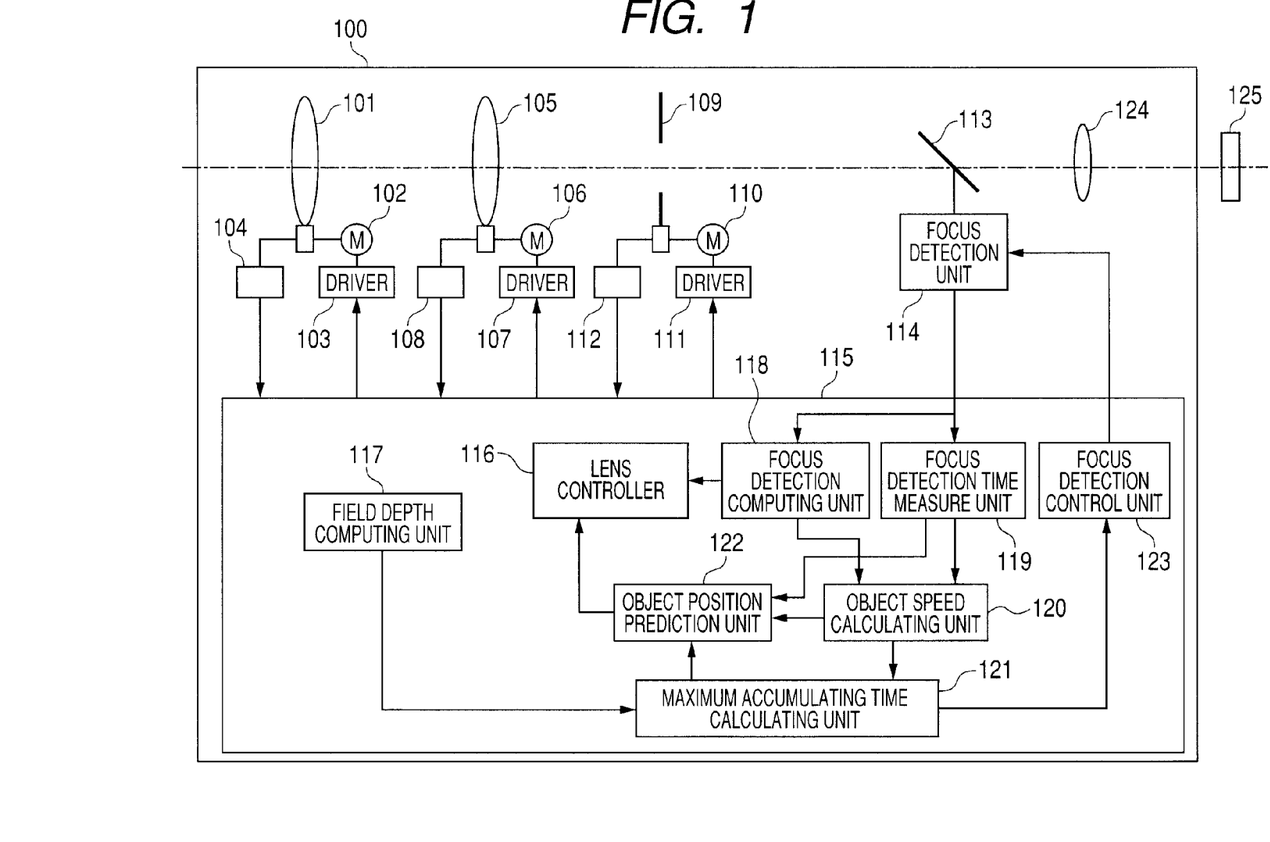
FIG. 1 is a diagram of first and second embodiments.

FIG. 1 is a diagram of a zoom lens apparatus 100 that is a first embodiment of an automatic focusing apparatus according to the present invention. A focus lens 101 moves in an optical axis direction and changes the position of an image plane of the zoom lens apparatus 100.

A focus motor 102 is connected to the focus lens 101. The focus motor 102 is driven by a focus driver 103 and moves the focus lens 101 in the optical axis direction. The position of the focus lens 101 is detected by a focus position detection unit 104.

The zoom lens 105 moves in the optical axis direction and changes focal length of the zoom lens apparatus 100. A zoom motor 106 is connected to the zoom lens 105. The zoom motor 106 is driven by the zoom driver 107 and moves the zoom lens 105 in the optical axis direction. The position of the zoom lens 105 is detected by a zoom position detection unit 108.

An iris motor 110 is connected to a movable stop 109. The iris motor 110 is driven by an iris driver 111 and drives the movable stop 109. The position of the movable stop 109 is detected by an iris position detection unit 112.

A spectral prism 113 divides light that has passed through the focus lens 101 and the zoom lens 105 into two light beams. One light beam transmitted through the spectral prism 113 passes through a relay lens 124 and is made incident on an image pickup element 125. The other light beam reflected by the spectral prism 113 is made incident on a focus detection unit 114. The focus detection unit 114 includes a phase difference detection lens and plural phase difference sensors. In the focus detection unit 114, each of the phase difference sensors photoelectrically converts a pair of images (two images), which is formed by the two light beams divided by the phase difference detection lens.

A lens controller 116 of a zoom lens control unit 115 drives the focus lens 101 on the basis of a result of a focus detection computing unit 118 and controls the zoom lens 105 and the movable stop 109.

A field depth computing unit 117 calculates a depth of field in the present focus position based on the position information received from the focus position detection unit 104, the zoom position detection unit 108, and the iris position detection unit 112 (or may read out the depth of field from a table). The focus detection computing unit 118 calculates a phase difference of the pair of image signals photoelectrically converted by the focus detection unit 114 and calculates a defocus amount. A focus detection time measuring unit 119 measures time in which the sensors of the focus detection unit 114 accumulate charges (hereinafter referred to as accumulating time). An object speed calculation unit 120 calculates moving speed of an object on the basis of information received from the focus detection computing unit 118 and the focus detection time measuring unit 119. A maximum accumulating time calculation unit 121 calculates maximum accumulating time of the sensors within which the focus control can be performed in the depth of field (hereinafter referred to as maximum accumulating time) based on information of the depth of field received from the field depth computing unit 117 and the object speed received from the object speed calculation unit 120. The maximum accumulating time is a maximum focus detection time that is permitted for the sensors. An object position prediction unit 122 calculates a predicted position of the object based on the accumulating time that is an output of the focus detection time measuring unit 119 and the object speed that is an output of the object speed calculation unit 120. The maximum accumulating time is described as being calculated. However the maximum accumulating time may be read out from a table or the like.

A focus detection control unit 123 switches control of the phase difference sensors according to the maximum accumulating time obtained by the maximum accumulating time calculation unit 121.

A control method is described in detail below with reference to a flowchart of FIG. 2 in the configuration described above.

Figure 2:
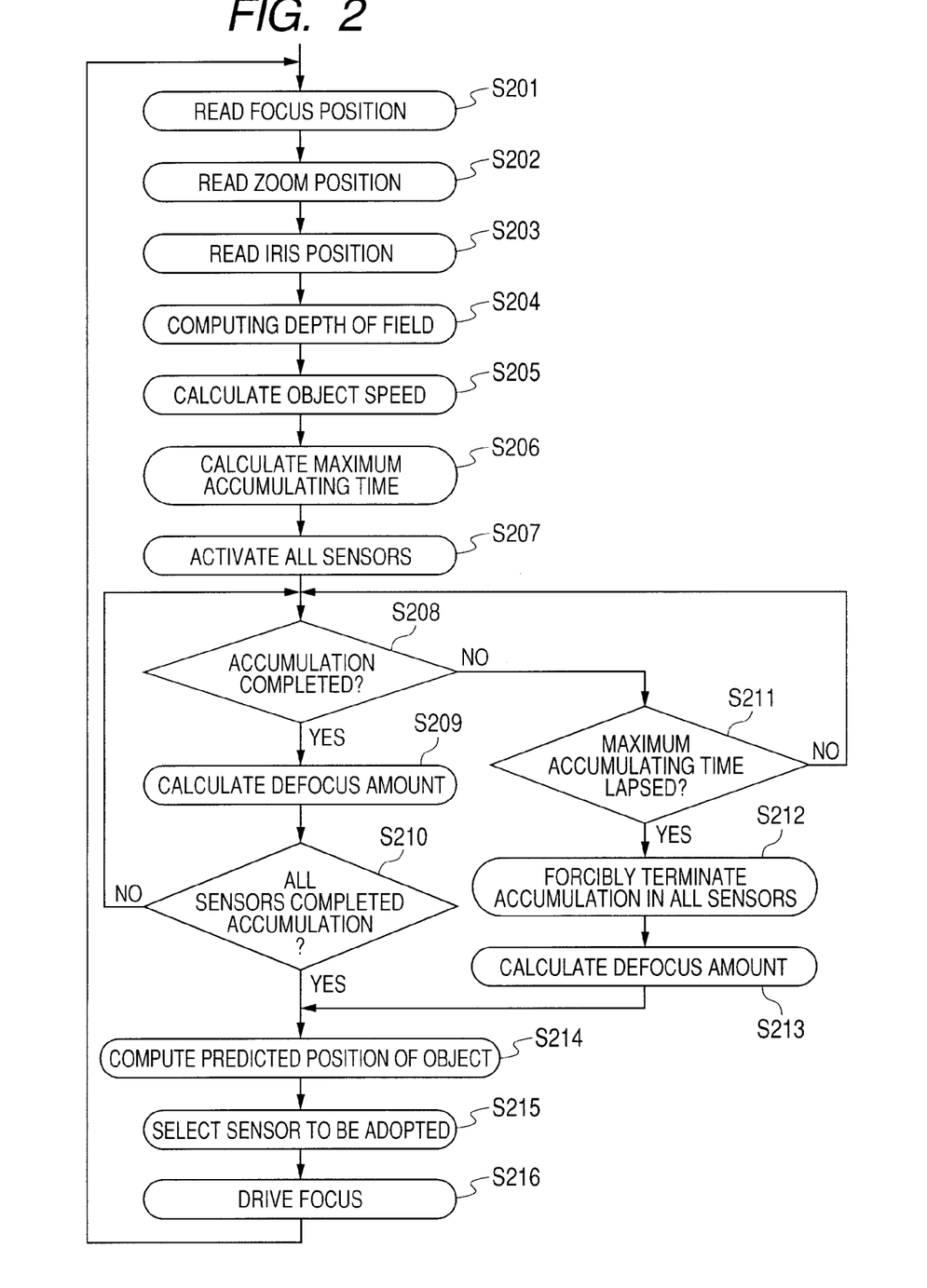
FIG. 2 is a flowchart of the first and second embodiments.

In step S201 in FIG. 2, the zoom lens apparatus 100 reads focus position detected by the focus position detection unit 104 and proceeds to step S202. In step S202, the zoom lens apparatus 100 reads zoom position detected by the zoom position detection unit 108 and proceeds to step S203. In step S203, the zoom lens apparatus 100 reads iris position detected by the iris position detection unit 112 and proceeds to step S204. In step S204, the zoom lens apparatus 100 calculates front depth of field d2 and rear depth of field d1 according to the following expression from focus position information read in step S201, zoom position information read in step S202, and iris position information read in step S203 and proceeds to step S205:

front depth of field $d2 = \sigma \times Fno \times L^2/f^2 - \sigma \times Fno \times L$ rear depth of field $d1 = \sigma \times Fno \times L^2/f^2 + \sigma \times Fno \times L$ where, σ represents a permissible circle of confusion, f represents focal length, L represents an object distance, and Fno represents an F number. The depth of field is described as being calculated. However, the depth of field may be read out from a table or the like.

In step S205, the zoom lens apparatus 100 calculates processing time T from a sum of sensor accumulation time measured by the focus detection time measuring unit 119 and time necessary for the calculation of a defocus amount in the focus detection computing unit 118. The zoom lens apparatus 100 further calculates, with the object speed calculation unit 121, object speed θ according to the following expression from the processing time T and an amount of change in focal length of the focus lens and proceeds to step S206.

processing time $T$ = accumulating time of the sensors + defocus amount calculation time object speed $\theta = A\tan$(an amount of change in the focal length of the focus lens/processing time $T$)

In step S206, the zoom lens apparatus 100 calculates a maximum accumulating time MaxT from the depth of field calculated in step S204 and the object speed calculated in step S205 and proceeds to step S207.

(When the object is moving toward the close direction)

maximum accumulating time $MaxT = (d1 - \Delta 1)/\tan \theta$ − defocus amount calculation time (When the object is moving toward the infinity direction)

maximum accumulating time $MaxT = (d2 - \Delta 2)/\tan \theta$ − defocus amount calculation time where, d1 represents rear depth of field and d2 represents front depth of field. Δ1 and Δ2 are constants for maintaining the focus state within the depth of field.

In step S207, the zoom lens apparatus 100 activates all the phase difference sensors that are targets of detection of focuses, starts charge accumulation, and proceeds to step S208. In step S208, the zoom lens apparatus 100 determines whether the charge accumulation of any one of the activated sensors is completed. When the charge accumulation is not completed, the zoom lens apparatus 100 proceeds to step S211. When the charge accumulation is completed, the zoom lens apparatus 100 proceeds to step S209.

In step S211, the zoom lens apparatus 100 determines whether the sensor accumulating time measured by the focus detection time measuring unit 119 has exceeded the maximum accumulating time MaxT. When the sensor accumulating time has not exceeded the maximum accumulating time MaxT, the zoom lens apparatus 100 returns to step S208 and determines an accumulation state again. When the sensor accumulating time has exceeded the maximum accumulating time MaxT, the zoom lens apparatus 100 proceeds to step S212. In step S212, the zoom lens apparatus 100 forcibly terminates accumulating operations of all the activated sensors and proceeds to step S213. In step S213, the zoom lens apparatus 100 reads outputs from the sensors in which the charge accumulation is forcibly terminated, calculates defocus amounts based on the respective outputs, calculates a focus drive amount, and proceeds to step S214.

In step S209, the zoom lens apparatus 100 reads outputs from the sensors in which the charge accumulation is completed, calculates defocus amounts, calculates a focus drive amount, and proceeds to step S210. In step S210, the zoom lens apparatus 100 determines whether accumulation of all the activated sensors is completed. When there is a sensor in which the charge accumulation is not completed, the zoom lens apparatus 100 returns to step S208 and enters a state of wait for accumulation. When the accumulation of all sensors is completed, the zoom lens apparatus 100 proceeds to step S214. Therefore, the zoom lens apparatus 100 repeats focus detection in the same focus position until all defocus amounts based on outputs of the plural phase difference sensors are calculated or sensor accumulating time exceeds the maximum accumulating time MaxT. In step S214, the zoom lens apparatus 100 calculates an object predicted position from the object speed calculated in step S205 by the object position prediction unit 122 and the sensor accumulating time measured by the focus detection time measuring unit 119 and proceeds to step S215. The focus predicted position can be calculated by, for example, the following expression:

processing time $T$=sensor accumulating time+defocus amount calculation time object predicted position=tan θ×processing time $T$ In step S215, the zoom lens apparatus 100 selects the sensor corresponding to an optimum defocus amount among the defocus amounts calculated based on the plural sensors in steps S209 and S213 and proceeds to step S216. In step S216, the zoom lens apparatus 100 drives the focus lens on the basis of a focus drive amount calculated from the sensor selected in step S215, and then returns to step S201 to repeat the series of operation.

Figure 3:
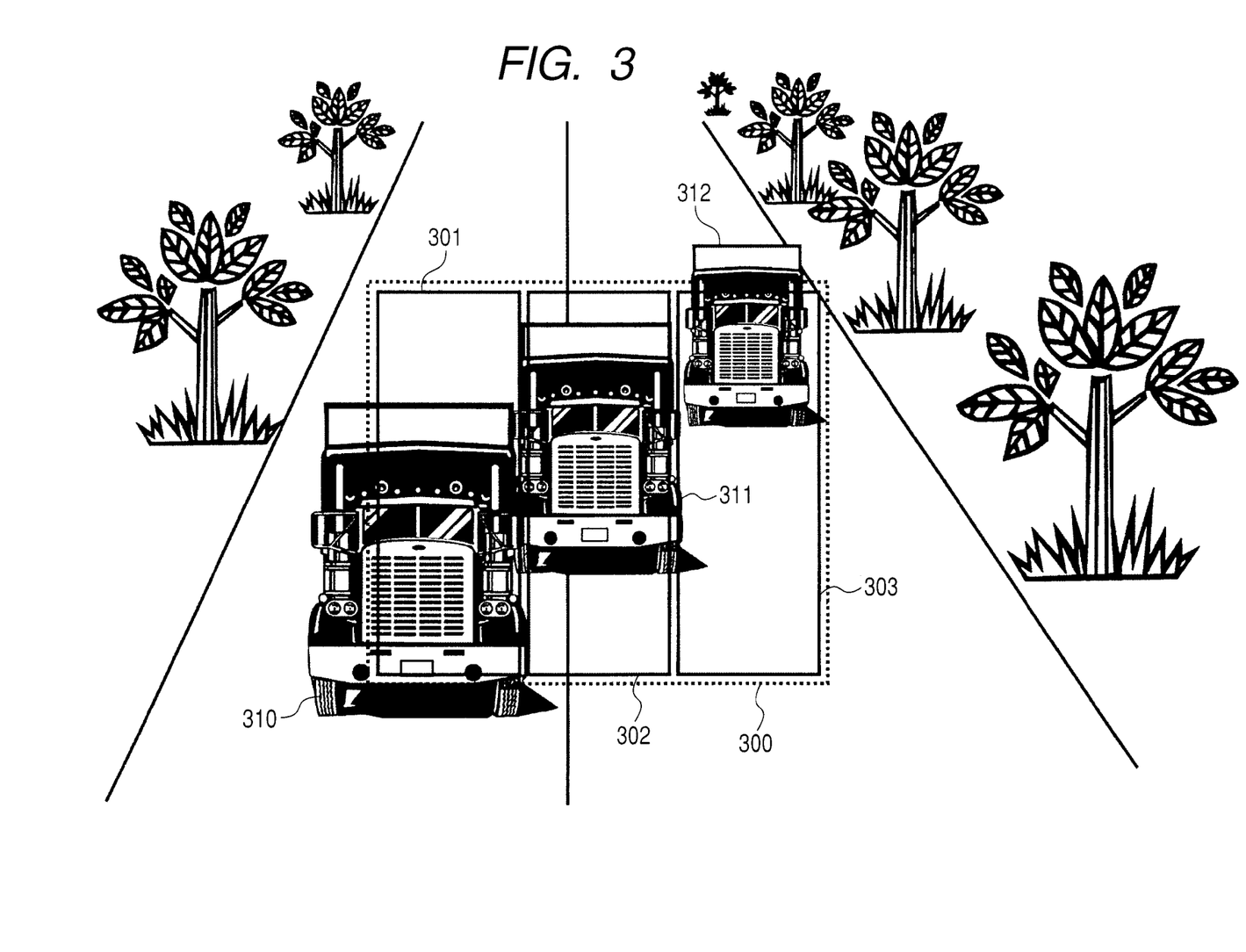
FIG. 3 is a focus detection diagram of the embodiments.
Figure 4:
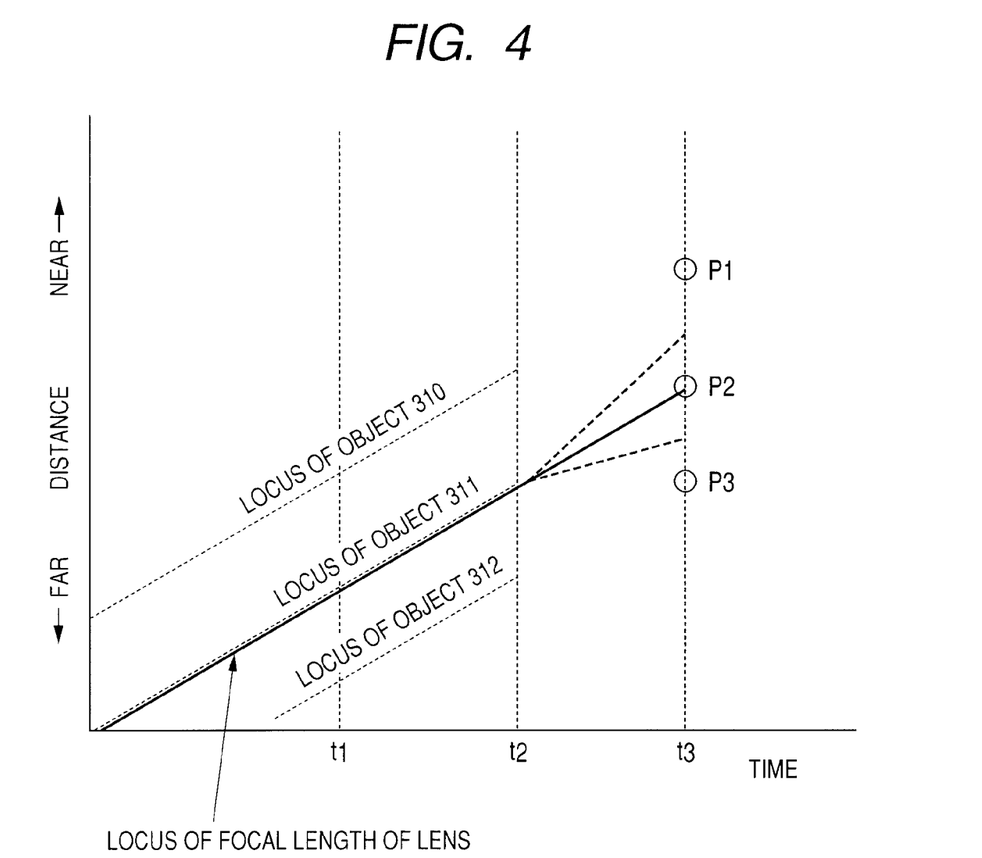
FIG. 4 is a locus diagram of a lens to which the first embodiment is applied.
Figure 5:
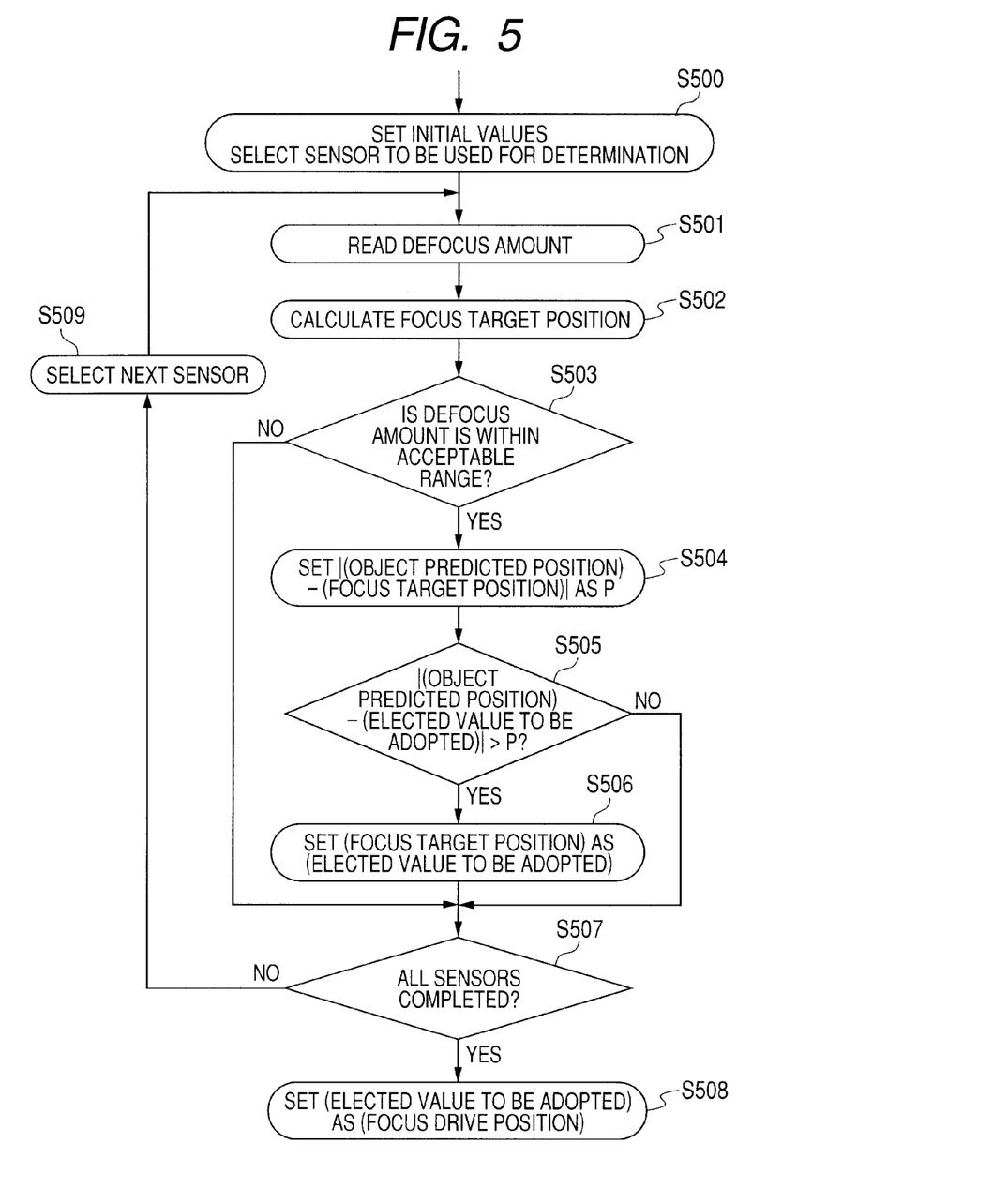
FIG. 5 is a flowchart of the first embodiment.

Operation for selecting the sensor in step S215 is described in detail with reference to FIGS. 3 and 4 and a flowchart of FIG. 5. As illustrated in FIG. 3, a focus detection area 300 is set with respect to plural objects 310, 311, and 312 that move in an optical axis direction. Plural focus detection sensors 301, 302, and 303 are set in the focus detection area. The focus detection sensors can detect focus states corresponding to respective detection areas thereof independently from one another. Loci of distances of the objects 310, 311, and 312 at this point and a locus of focal length of a lens are illustrated in FIG. 4. In FIG. 4, the ordinate indicates a distance (the upper side indicates a close-range side and the lower side indicates an infinity side) and the abscissa indicates time.

In FIG. 4, the focus detection sensor 302 is adopted until time t2 and an in-focus state is maintained with respect to the object 311. Operation at time t3 is described with reference to the flowchart of FIG. 5.

First, in step S500, the zoom lens apparatus 100 sets an initial value for a target drive position (hereinafter referred to as elected value to be adopted) to which the focus lens is driven and selects a focus detection sensor served for the determination first. It is assumed that the focus detection sensor 301 is selected first. In step S500, as the initial value of the elected value to be adopted, for example, the object predicted position calculated in step S214 can be used.

In step S501, the zoom lens apparatus 100 reads a defocus amount detected by the focus detection sensor 301. In step S502, the zoom lens apparatus 100 calculates a focus target position (P1 in FIG. 4). In step S503, the zoom lens apparatus 100 determines whether the focus target position P1 is within a predetermined allowable range indicated by dotted lines in FIG. 4 with respect to the object predicted position calculated in step S214. Since the focus target position P1 in FIG. 4 is outside the allowable range, the zoom lens apparatus 100 proceeds to step S507. The allowable range is a range set on the basis of information such as the object predicted position calculated in step S214 and the object speed θ in the optical axis direction calculated in step S204.

In step S507, the zoom lens apparatus 100 determines whether determination in all the focus detection sensors is completed. In this example, since the determination for all the sensors is not completed, in step S509, the zoom lens apparatus 100 selects the next focus detection sensor 302 and returns to step S501.

In step S501, the zoom lens apparatus 100 reads a defocus amount detected by the next focus detection sensor 302. In step S502, the zoom lens apparatus 100 calculates a focus target position (P2 in FIG. 4). In step S503, the zoom lens apparatus 100 determines whether the focus target position P2 is within the predetermined allowable range with respect to the object predicted position calculated in step S214. Since the focus target position P2 in FIG. 4 is within the allowable range, the zoom lens apparatus 100 proceeds to step S504. In step S504, the zoom lens apparatus 100 calculates a difference value P between the object predicted position and the focus target position P2 and proceeds to step S505. In step S505, the zoom lens apparatus 100 compares a difference value between the object predicted position and the elected value to be adopted with the difference value P. When the difference value P is smaller, the zoom lens apparatus 100 proceeds to step S506. When the difference value P is larger, the zoom lens apparatus 100 proceeds to step S507.

In step S506, the zoom lens apparatus 100 registers anew the focus target position P2 as an elected value to be adopted and proceeds to step S507. In step S507, the zoom lens apparatus 100 determines whether determination in all the focus detection sensors is completed. In this example, since the determination for all the sensors is not completed, in step S509, the zoom lens apparatus 100 selects the next focus detection sensor 303 and returns to step S501.

In step S501, the zoom lens apparatus 100 reads a defocus amount detected by the next focus detection sensor 303. In step S502, the zoom lens apparatus 100 calculates a focus target position (P3 in FIG. 4). In step S503, the zoom lens apparatus 100 determines whether the focus target position P3 is within the predetermined allowable range with respect to the object predicted position calculated in step S214. Since the focus target position P3 in FIG. 4 is outside the allowable range, the zoom lens apparatus 100 proceeds to step S507. In step S507, the zoom lens apparatus 100 determines again whether determination in all the focus detection sensors is completed. Since the determination is completed, the zoom lens apparatus 100 proceeds to step S508.

In step S508, the zoom lens apparatus 100 adopts the registered focus target position P2 as a drive position for the focus lens.

As described above, according to this embodiment, the position of the object is predicted from a moving locus of the object within the maximum accumulating time. Focuses in the plural focus detection areas are detected by the plural focus detection sensors, the focuses are compared with the object predicted position to select a sensor to be adopted, and focus control is performed. Consequently, it is possible to maintain the in-focus state.

Second Embodiment

A configuration and a flowchart of a second embodiment of the present invention are respectively illustrated in FIGS. 1 and 2. Since the configuration and the flowchart are the same as those in the first embodiment, description of the configuration and the flowchart is omitted.

The selecting operation of sensor to be adopted in step S215 of the flowchart of FIG. 2 is described in detail with reference to FIGS. 3, 6, and 7.

As illustrated in FIG. 3, the plural focus detection sensors 301, 302, and 303 are set with respect to the plural objects 310, 311, and 312 that move in the optical axis direction. The plural focus detection sensors 301, 302, and 303 are set in the focus detection area. The focus detection sensors can detect focus states corresponding to respective detection areas thereof independently from one another. Loci of distances of the objects 310, 311, and 312 at this point and a locus of focal length of a lens are illustrated in FIG. 6. In FIG. 6, the ordinate indicates a distance (the upper side indicates a close-range side and the lower side indicates an infinity side) and the abscissa indicates time.

Figure 6:
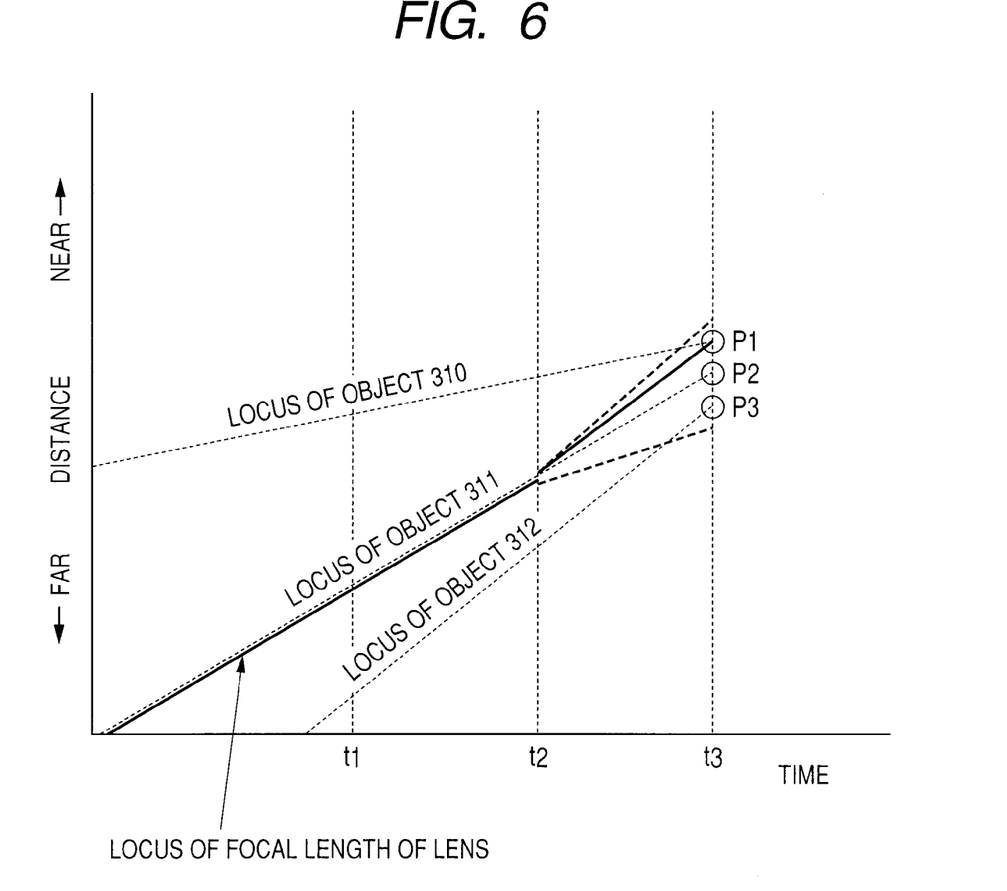
FIG. 6 is a locus diagram of a lens to which the second embodiment is applied.
Figure 7:
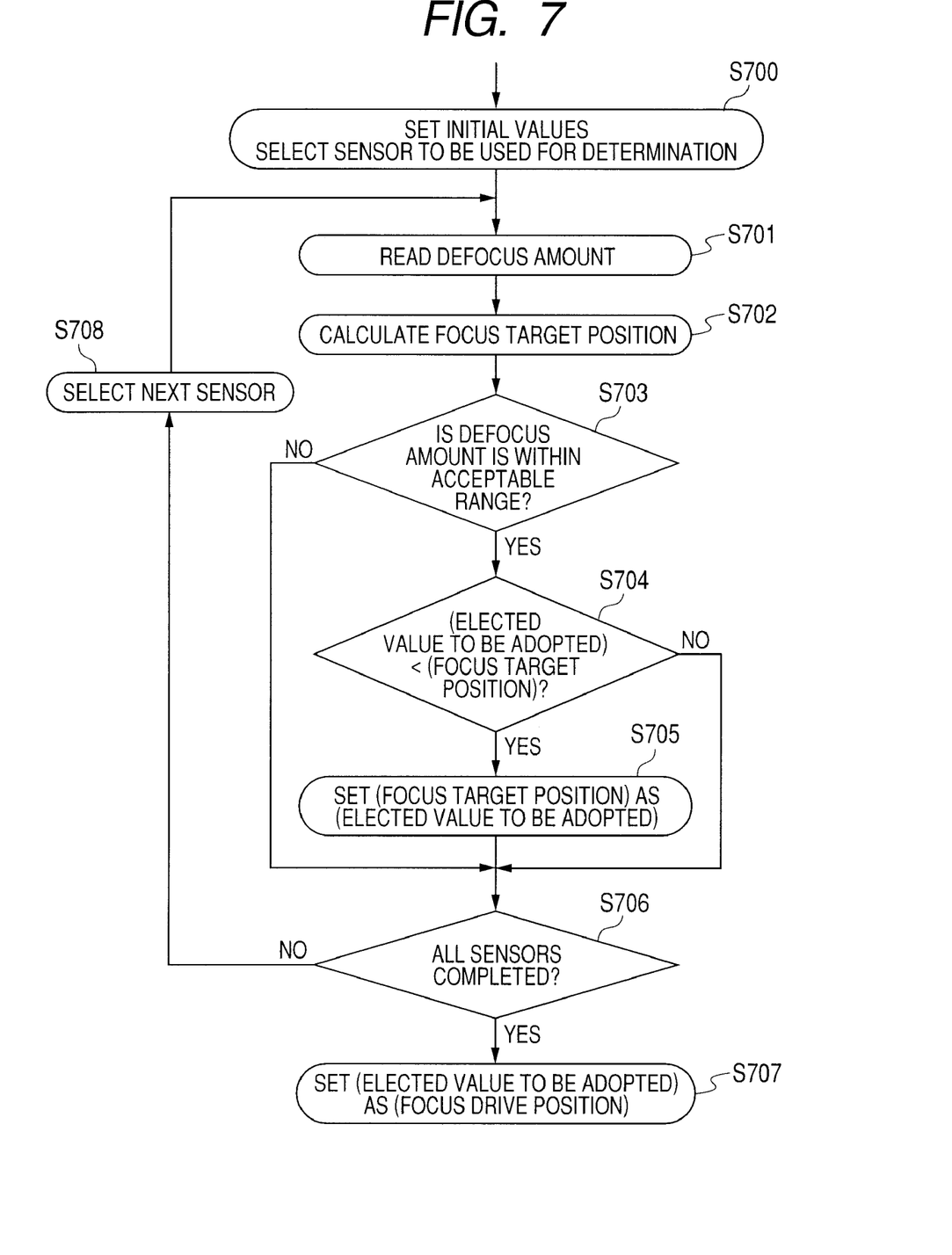
FIG. 7 is a flowchart of the second embodiment.

In FIG. 6, the focus detection sensor 302 is adopted until time t2 and an in-focus state is maintained with respect to the object 311. Operation at time t3 is described with reference to the flowchart of FIG. 7.

First, in step S700, the zoom lens apparatus 100 sets an initial condition as in step S500 in the first embodiment. In step S701, the zoom lens apparatus 100 reads a defocus amount detected by the focus detection sensor 301. In step S702, the zoom lens apparatus 100 calculates a focus target position (P1 in FIG. 6).

In step S703, the zoom lens apparatus 100 determines whether the focus target position (P1 in FIG. 6) is within a predetermined allowable range indicated by dotted lines in FIG. 6 with respect to the object predicted position calculated in step S214. Since the focus target position P1 in FIG. 6 is within the allowable range, the zoom lens apparatus 100 proceeds to step S704. The allowable range can be defined in the same manner as in the first embodiment.

In step S704, the zoom lens apparatus 100 compares an elected value to be adopted and the focus target position P1. Since the focus target position P1 is larger (the focus target position P1 is closer than the elected value to be adopted), the zoom lens apparatus 100 proceeds to step S705. In step S705, the zoom lens apparatus 100 registers the target position P1 as an elected value to be adopted and proceeds to step S706. In step S706, the zoom lens apparatus 100 determines whether determination for all the sensors is completed. When the determination is not completed, in step S708, the zoom lens apparatus 100 selects the next focus detection sensor and returns to step S701.

In step S701, the zoom lens apparatus 100 reads a defocus amount detected by the next focus detection sensor 302 selected in step S708. In step S702, the zoom lens apparatus 100 calculates a focus target position (P2 in FIG. 6). In step S703, the zoom lens apparatus 100 determines whether the focus target position P2 is within the predetermined allowable range with respect to the object predicted position calculated in step S214. Since the focus target position P2 in FIG. 6 is within the allowable range, the zoom lens apparatus 100 proceeds to step S704. In step S704, the zoom lens apparatus 100 compares the focus target position P1, which is already registered as the elected value to be adopted, and the focus target position P2. Since the focus target position P1 is larger (the focus target position P1 as the elected value to be adopted is closer than the focus target position P2), the zoom lens apparatus 100 proceeds to step S706. In step S706, the zoom lens apparatus 100 determines whether determination for all the sensors is completed. When the determination is not completed, in step S708, the zoom lens apparatus 100 selects the next focus detection sensor and returns to step S701.

In step S701, the zoom lens apparatus 100 reads a defocus amount detected by the next focus detection sensor 303 selected in step S708. In step S702, the zoom lens apparatus 100 calculates a focus target position (P3 in FIG. 6). In step S703, the zoom lens apparatus 100 determines whether the focus target position P3 is within the predetermined allowable range with respect to the object predicted position calculated in step S214. Since the focus target position P3 in FIG. 6 is within the allowable range, the zoom lens apparatus 100 proceeds to step S704. In step S704, the zoom lens apparatus 100 compares the focus target position P1, which is already registered as the elected value to be adopted, and the focus target position P3. Since the focus target position P1 is larger (the focus target position P1 as the elected value to be adopted is closer than the focus target position P3), the zoom lens apparatus 100 proceeds to step S706. In step S706, the zoom lens apparatus 100 determines whether determination for all the focus detection sensors is completed.

In this example, since the determination for all the sensors is completed, the zoom lens apparatus 100 proceeds to step S707.

In step S707, the zoom lens apparatus 100 adopts the registered focus target position P1 as a drive position for the focus lens.

As described above, according to this embodiment, the position of the object is predicted from a moving locus of the object within the maximum accumulating time. Focuses of the object in the plural focus detection areas are detected by the plural focus detection sensors. The sensor that detects the object located in a closest range side among the detected focuses of the object in the plural focus detection areas within the allowable range with respect to the object predicted position is selected and focus control is performed. Consequently, it is possible to maintain an in-focus state. The exemplary embodiments of the present invention have been described. However, the present invention is not limited to the embodiments. Various modifications and alterations of the embodiments are possible without departing from the gist of the present invention.

If a lens apparatus is configured to include: a shooting lens which forms an image of the object and includes a focus lens which is driven during focusing; and an automatic focusing apparatus according to any one of the above described embodiments which drives the focus lens, the lens apparatus can realize the above-described advantageous effect of the present invention. Further, if an image pickup apparatus is configured to have: a shooting lens which forms an image of the object and includes a focus lens which is driven during focusing; an image pickup element which receives light of the image of the object formed by the shooting lens; and an automatic focusing apparatus according to any one of the above described embodiments which drives the focus lens, the image pickup apparatus can realize the above-described advantageous effect of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-110873, filed Apr. 30, 2009, which is hereby incorporated by reference herein in its entirety.

What is claimed is:

1. An automatic focusing apparatus comprising:
   plural focus detection units that detect focus states in plural areas independently from one another;
   a measuring unit that measures focus detection time of the detection by the focus detection units;
   a unit that sets a maximum focus detection time;
   a defocus calculation unit that calculates defocus amounts on the basis of outputs from the focus detection units;
   a focus drive unit that drives a focus lens on the basis of the defocus amounts; and
   an object position prediction unit that calculates an object predicted position based on the defocus amounts and the focus detection time,
   wherein when the focus detection time exceeds the maximum focus detection time, all detections of focus positions by the plural focus detection units are completed,
   wherein the defocus calculation unit calculates defocus amounts corresponding to the respective plural areas on the basis of the focus states in the areas detected by the plural focus detection units, and wherein the focus lens is driven according to an output of the focus detection unit corresponding to a focus target position among focus target positions based on the plural defocus amounts where a difference between the focus target position and the object predicted position is within an allowable range.

2. The automatic focusing apparatus according to claim 1, wherein focus detection is repeated in a same position until all the defocus amounts based on the plural focus detection units are calculated or until the focus detection time exceeds the maximum focus detection time.

3. The automatic focusing apparatus according to claim 1, wherein, in selection of the focus detection unit corresponding to the focus target position where a difference between the focus target position and the object predicted position is within the allowable range, the focus detection unit which indicates the focus target position closest to the object predicted position is selected and the focus lens is driven according to the defocus amount based on the focus detection unit.

4. The automatic focusing apparatus according to claim 1, wherein, in selection of the focus detection unit corresponding to the focus target position where a difference between the focus target position and the object predicted position is within the allowable range, the focus detection unit which indicates the focus target position on a closest range side is selected and the focus lens is driven according to the defocus amount based on the focus detection unit.

5. The automatic focusing apparatus according to claim 1, wherein, in selection of the focus detection unit corresponding to the focus target position where a difference between the focus target position and the object predicted position is within the allowable range, when all the focus target positions are outside the allowable range, a defocus amount is calculated in the defocus calculation unit on the basis of the object predicted position and the focus lens is driven according to the defocus amount.

6. A lens apparatus, comprising:
a shooting lens which forms an image of the object and includes a focus lens which is driven during focusing; and
an automatic focusing apparatus according to claim 1,
wherein the automatic focusing apparatus drives the focus lens included in the shooting lens.

7. An image pickup apparatus, comprising:
a shooting lens which forms an image of the object and includes a focus lens which is driven during focusing;
an image pickup element which receives light of the image of the object formed by the shooting lens; and
an automatic focusing apparatus according to claim 1,
wherein the automatic focusing apparatus drives the focus lens included in the shooting lens.

* * * * *